(12) United States Patent
Grote et al.

(10) Patent No.: US 9,314,939 B2
(45) Date of Patent: Apr. 19, 2016

(54) HEAT SHIELD ELEMENT, METHOD AND MOLD FOR THE PRODUCTION THEREOF, HOT-GAS LINING AND COMBUSTION CHAMBER

(75) Inventors: Holger Grote, Bonn (DE); Andreas Heilos, Mülheim an der Ruhr (DE); Marc Tertilt, Hattingen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 434 days.

(21) Appl. No.: 12/774,049

(22) Filed: May 5, 2010

(65) Prior Publication Data

US 2010/0213645 A1    Aug. 26, 2010

Related U.S. Application Data

(62) Division of application No. 11/792,068, filed as application No. PCT/EP2005/012447 on Nov. 21, 2005.

(30) Foreign Application Priority Data

| Dec. 1, 2004 | (EP) | .................................... 04028445 |
| Jul. 1, 2005 | (EP) | .................................... 05014376 |
| Jul. 7, 2005 | (EP) | .................................... 05014798 |

(51) Int. Cl.
*B29C 39/00* (2006.01)
*B29C 39/34* (2006.01)
*B28B 7/00* (2006.01)
*B28B 1/16* (2006.01)

(Continued)

(52) U.S. Cl.
CPC ............... *B28B 7/0014* (2013.01); *B28B 1/16* (2013.01); *B28B 7/0079* (2013.01); *B28B 23/0056* (2013.01); *C04B 35/1015* (2013.01); *C04B 35/117* (2013.01); *C04B 35/565* (2013.01); *F23M 5/02* (2013.01); *F23R 3/007* (2013.01); *C04B 2235/3418* (2013.01); *C04B 2235/3463* (2013.01); *C04B 2235/602* (2013.01); *C04B 2235/6027* (2013.01); *F23M 2900/05004* (2013.01)

(58) Field of Classification Search
CPC ................................ B29C 39/00; B29C 39/34
USPC ........................................... 264/109, 642, 299
See application file for complete search history.

(56) References Cited

U.S. PATENT DOCUMENTS 1,943,263 A * 1/1934 Simpson ........................ 428/332
2,425,137 A   8/1947 Troiel
(Continued)

FOREIGN PATENT DOCUMENTS

EP    1142852 A2    10/2001
JP    04089215 A     3/1992

*Primary Examiner* — Christina Johnson
*Assistant Examiner* — Xue Liu

(57) ABSTRACT

There is described a heat shield element comprising a hot side which is turned towards the hot medium, a cold side which is turned away from the hot medium, peripheral sides which connect the hot side to the cold side and a material volume which is defined by the hot side, the cold side and the peripheral sides, wherein the material volume comprises at least two material areas which are made of different materials. The materials are different from each other at least in respect of their resistance and/or thermal expansion coefficient.

7 Claims, 12 Drawing Sheets

(51) Int. Cl.
*B28B 23/00* (2006.01)
*F23M 5/02* (2006.01)
*F23R 3/00* (2006.01)
*C04B 35/101* (2006.01)
*C04B 35/117* (2006.01)
*C04B 35/565* (2006.01)

(56) References Cited

U.S. PATENT DOCUMENTS

| | | | |
|---|---|---|---|
| 4,389,036 A | 6/1983 | Abou-Ezzeddine | |
| 4,485,630 A * | 12/1984 | Kenworthy | 60/757 |
| 2004/0050060 A1 * | 3/2004 | Taut | 60/752 |
| 2004/0110041 A1 * | 6/2004 | Merrill et al. | 428/699 |

* cited by examiner

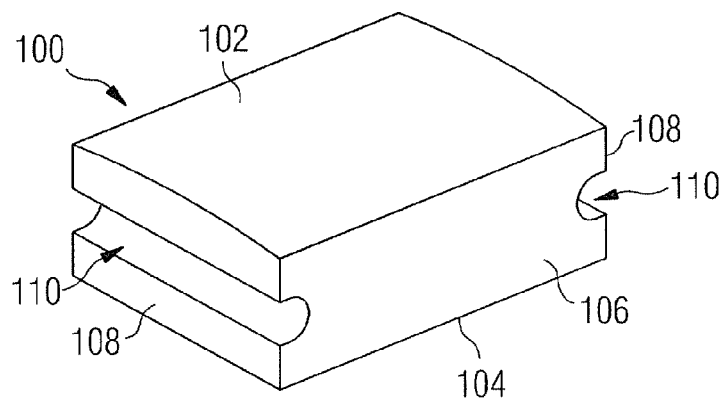
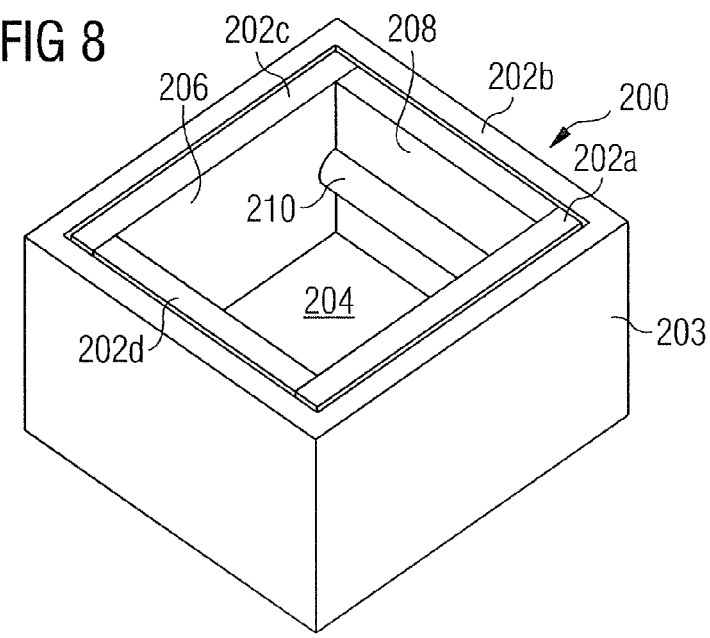
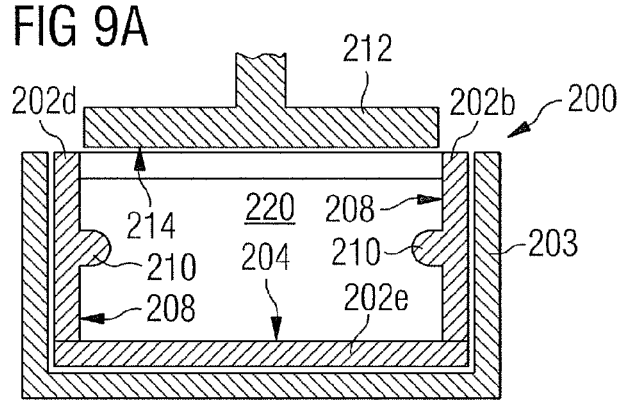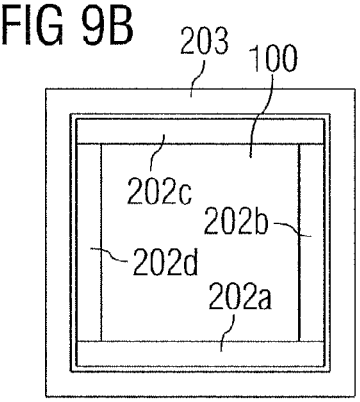

HEAT SHIELD ELEMENT, METHOD AND MOLD FOR THE PRODUCTION THEREOF, HOT-GAS LINING AND COMBUSTION CHAMBER

CROSS REFERENCE TO RELATED APPLICATIONS

This application is a divisional of Ser. No. 11/792,068 file May 31, 2007, which is the US National Stage of International Application No. PCT/EP2005/012447, filed Nov. 21, 2005 and claims the benefit thereof. The International Application claims the benefits of European application No. 04028445.7 EP filed Dec. 1, 2004, European application No. 05014376.7 EP filed Jul. 1, 2005, and European application No. 05014798.2 EP filed Jul. 7, 2005. All of the applications are incorporated by reference herein in their entirety.

FIELD OF INVENTION

The present invention relates to a heat-shield element, in particular a ceramic heat-shield element, a method for the production of a ceramic heat-shield element, a hot-gas lining constructed from heat-shield elements and a combustion chamber equipped with a hot-gas lining, which combustion chamber can be embodied in particular as a gas turbine combustion chamber. The invention also relates to a mold for the production of a ceramic heat-shield element.

BACKGROUND OF INVENTION

The walls of hot gas-conducting combustion chambers, for example of gas turbine plants, require a thermal shielding of their supporting structure against attack by hot gas. The thermal shielding can be implemented for example by means of a hot-gas lining, e.g. in the form of a ceramic heat shield, disposed in front of the actual combustion-chamber wall. A hot-gas lining of this type is usually constructed from a number of metal or ceramic heat-shield elements with which the combustion-chamber wall is lined over its surface area. Compared with metal materials, ceramic materials are ideally suited for the construction of a hot-gas lining due to their high temperature stability, corrosion resistance and low thermal conductivity. A ceramic heat shield is described for example in EP 0 558 540 B1.

Due to material-specific thermal expansion properties and to the temperature differences typically arising in the operating context—say, between the ambient temperature when the gas-turbine plant is at a standstill and the maximum temperature at full loading—the heat transferability, particularly of ceramic heat shields, as a result of temperature-dependent expansion must be ensured so that thermal stresses that will destroy a heat shield do not occur as a result of the prevention of temperature-dependent expansion. Expansion gaps are therefore present between the individual heat-shield elements so as to enable thermal expansion of the heat-shield elements. For safety reasons, the expansion gaps are designed such that they are never fully closed even when the hot gas is at maximum temperature. It must therefore be ensured that the hot gas does not pass via the expansion gap to the supporting wall structure of the combustion chamber. In order to seal the expansion gaps against the ingress of hot gas, these expansion gaps are frequently flushed with a flow of sealing air flowing in the direction of the interior of the combustion chamber. Air which simultaneously serves as cooling air for cooling the retaining brackets holding the heat-shield elements is generally used as sealing air, and this leads among other things to the occurrence of temperature gradients in the region of the edges of a heat-shield element. As a consequence of flushing the expansion gaps with sealing air, the peripheral sides adjacent to the gaps are cooled, as is the cold side of the heat-shield elements. On the hot side of the heat-shield element, on the other hand, a high thermal input takes place due to the hot gas. Inside a heat-shield element, a three-dimensional temperature distribution therefore arises, which is characterized by a decline in temperature from the hot side to the cold side and by a temperature decline from central points of the heat-shield element toward the edges. Therefore, in ceramic heat-shield elements in particular, even where adjacent heat-shield elements do not touch one another, stresses can occur on the hot side which can lead to cracking and can thus adversely affect the service life of the heat-shield elements.

The heat-shield elements in a gas-turbine combustion chamber are typically embodied in a laminar manner and arranged parallel to the supporting structure. A temperature gradient that runs perpendicular to the surface of the supporting structure leads only to comparatively low thermal stresses, provided that, in respect of the ceramic heat-shield element in the assembled state, they can be prevented in the direction of the interior of the combustion chamber without hindrance.

A temperature gradient running parallel to the supporting structure, like that which runs from the peripheral surfaces of the heat-shield element to the center of the heat-shield element brings with it rapidly increased thermal stresses as a result of the rigidity of plate-like geometries with regard to deformations parallel to their largest area of projection surfaces. These thermal stresses result in the cold edges of the peripheral surfaces being placed under tension as a consequence of their comparatively low thermal expansion by hotter central areas which are subjected to greater thermal expansion. This tension can, where the tensile strength of a material is exceeded, lead to the formation of cracks which emanate from the edges of the heat-shield element and run toward central areas of the heat-shield element.

The cracks reduce the supporting cross section of the heat-shield element. The longer the cracks, the smaller is the supporting residual cross section of the heat-shield element. The thermally induced cracks can lengthen as a result of mechanical strains arising during operation of the gas-turbine plant, which leads to a further reduction of the residual cross section and may make the replacement of the heat-shield element necessary. Such mechanical strains occur for example where there are oscillating accelerations of the combustion-chamber wall which can be caused by combustion vibrations, that is vibrations in the combustion waste gases.

In order to reduce the demand for sealing air—and thus thermally induced stresses in heat-shield elements—, EP 1 302 723 A1 proposed arranging flow barriers in the expansion gaps. This can also lead to a reduction of the temperature gradient in the region of the edges. The introduction of flow barriers is not, however, always readily possible and also increases the complexity of a heat shield.

Alternative procedures consist in using heat-shield elements made of metal. While metal heat-shield elements exhibit greater resistivity to temperature fluctuations and mechanical loadings than ceramic heat-shield elements, they necessitate, in gas-turbine combustion chambers for example, costly cooling of the heat shield since they have a higher thermal conductivity than ceramic heat-shield elements. Moreover, metal heat-shield elements are more susceptible to corrosion and, on account of their lower temperature stability, cannot be exposed to such high temperatures as ceramic heat-shield elements.

SUMMARY OF INVENTION

In order to minimize cracking, efforts are therefore generally made to keep the thermal loading on the heat-shield elements of a heat shield as low as possible.

It is currently common to cast or to press ceramic heat-shield elements. In order to illustrate the casting or compression molding process, a heat-shield element and a mold for producing the heat-shield element will be described below with reference to FIGS. 7 to 9.

The ceramic heat-shield element 100 shown in FIG. 7 has a hot side 102 which faces toward the hot gas when the heat-shield element 100 is installed in the heat shield of a combustion chamber. Opposite the hot side 102 is the cold side 104 which faces toward the combustion-chamber wall that is to be protected when the heat-shield element 100 is installed in a heat shield. In addition, peripheral sides 106, 108 are present which extend between the hot side 102 and the cold side 104. Two peripheral sides 108 lying opposite one another are also furnished with grooves 110 which serve to fix the heat-shield element 100 in position on the supporting wall structure by means of retaining brackets.

FIG. 8 shows in a perspective representation a compression mold 200 for producing the heat-shield element from FIG. 7. The mold 200 consists of a number of mold parts 202a to 202e which are inserted into a molding box 203 and held in position thereby. The internal surfaces 204, 206, 208 of the mold parts 202a to 202e represent the mold surfaces for molding the surface of the heat-shield element 100. Thus, for example, the internal surface 204 serves for molding the cold side 104 of the heat-shield element 100, the internal surfaces 206 for molding the side surfaces 106 without a groove and the internal surfaces 208 for molding the side surfaces 208 with a groove 100. The internal surfaces 208 have spring-like projections 210 for shaping the grooves 110.

In order to produce the ceramic heat-shield element 100, a ceramic molding compound 220 is introduced into the mold 200 with the installed mold parts 202a to 202e and then pressed into shape by means of a die 212. The surface 214 of the die 212 facing toward the molding compound 220 molds the hot-gas surface 102 of the ceramic heat-shield element 100. The compressive pressure necessary for compressing the molding compound 220 requires that the mold 200 be fully closed during the compression-molding process, i.e. the die 212 must be fashioned so as to fit the mold 200 precisely. Furthermore, the compressive pressure can lead to a springing back of the mold parts. Variations in the quantity of material of the molding compound 220 can also lead to variations in the thickness of the finished ceramic heat-shield element.

As an alternative to compression molding, the heat-shield element 100 can also be cast using the mold 200, i.e. without a compression-molding process taking place. Since the heat-shield element 100 is cast in a horizontal position, however, either the hot side 102 or the cold side 104 is not defined by the mold during the casting process. The undefined side requires after the casting time-consuming reworking in order to produce the desired shape of the heat-shield element 100.

Finally, the molds described are not suitable for producing a heat-shield element which has different material zones with different material properties in a single casting or compression-molding step. The production of heat-shield elements with reinforcing elements on the inside is also not possible.

It is an object of the present invention to provide a heat-shield element which has improved properties with regard to cracking.

It is a further object of the present invention to provide an advantageous heat shield and a combustion chamber furnished with an advantageous heat shield.

It is also an object of the present invention to provide a method for the production of advantageous heat-shield elements.

Finally, it is an object of the present invention to provide a mold for the production of a ceramic heat-shield element, that is advantageous compared to the described prior art.

The first object of the invention is achieved in a heat-shield element as claimed in an independent claim, the second object in a hot-gas lining as claimed in a further independent claim and in a combustion chamber, the third object is a claimed method and the fourth a claimed mold. The dependent claims contain advantageous further developments of the invention.

A heat-shield element according to the invention has a hot side to be faced toward a hot medium, a cold side to be faced away from the hot medium and peripheral sides connecting the hot side to the cold side. The hot side, the cold side and the peripheral sides define the material volume of the heat-shield element. In the heat-shield element according to the invention, the material volume comprises at least two material zones made of different materials, the materials differing at least in respect of their resistances and/or coefficients of thermal expansion.

With suitable coefficients of thermal expansion, the thermal expansion of the material zones can be influenced selectively. In particular, if material zones which are intended for relatively high operating temperatures have a relatively low coefficient of thermal expansion and material zones which are intended for relatively low operating temperatures have a relatively high coefficient of thermal expansion, the stresses inside the heat-shield element can be reduced during operation of a heat shield and the tendency for cracks to form thus reduced. A relatively low or relatively high operating temperature is in each case here to be understood in relation to the operating temperature for which the material of the other material zones of the heat-shield element is designed. The same applies by analogy to the relatively low and the relatively high coefficients of thermal expansion.

Different rigidities of different material zones make it possible to influence in an advantageous manner the length of cracks that occur. A more rigid material makes it more difficult for cracks to propagate and thereby, in particular, leads to a reduction in the length of cracks that occur. It has been shown both in theory and in practice that short cracks emanating from the edges, which advance only slightly toward the center of the heat-shield element (up to approx. 10% of the supporting length of the heat-shield element) do not substantially impede the serviceability of the heat-shield element. The combining of rigid and less rigid material in a heat-shield element enables the use of the rigid material even where the rigid material has a lower thermal loading capacity compared with the less rigid material. It can therefore be particularly advantageous if the material in material zones which are intended for relatively high operating temperatures have a relatively low rigidity and the material in material zones which are intended for relatively low operating temperatures have a relatively high rigidity. A relatively low or a relatively high rigidity is to be understood in each case here in relation to the rigidity of the material of other material zones of the heat-shield element.

The last-mentioned embodiment also makes it possible for the material of those material zones which are intended for relatively high operating temperatures to be optimally adapted to the high operating temperatures without having to pay too much regard to the rigidity of the material used. Conversely, the material of those material zones which are intended for the relatively low operating temperatures can be optimized in terms of its rigidity without having to pay too much regard to its thermal properties.

A particularly advantageous heat-shield element is obtained if material zones which are intended for relatively high operating temperatures have both a relatively low coefficient of thermal expansion and a relatively low rigidity and material zones which are intended for relatively low operating temperatures have both a relatively high coefficient of thermal expansion and a relatively high rigidity. In this case, on the one hand the rate of cracking can be reduced and on the other the propagation of cracks which nonetheless occur can be counteracted.

In a further embodiment of the heat-shield element according to the invention, at least one material zone made of a material with a relatively low coefficient of thermal expansion and/or relatively low rigidity is adjacent to the hot side of the heat-shield element, whereas at least one material zone made of a material with a relatively high coefficient of thermal expansion and/or relatively high rigidity is adjacent to the cold side of the heat-shield element. On the hot side, greater temperature differences occur upon transition from the ambient temperature (for example, during standstill of a gas-turbine plant) to maximum operating temperature (for example, at full loading of a gas-turbine plant) than on the cooled cold side of the heat-shield element. The different temperature differences are compensated for in the embodiment described by the coefficient of thermal expansion of the heat-shield element in the area of the hot side being lower than in the area of the cold side. Through suitable selection of the coefficients of thermal expansion, the temperature-determined material expansion in the area of the cold side can be adapted to the temperature-determined material expansion in the area of the hot side, as a result of which material stresses in the heat-shield element can be reduced. The material which during operation of the gas-turbine plant is cooler in a material zone adjacent to the cold side can also be optimized in respect of its rigidity. In the process, it can also be taken into consideration, for example, that this material has a lower resistance to high temperatures than the material adjacent to the hot side.

In addition, at least one material zone made of a material with a relatively high coefficient of thermal expansion and/or relatively high rigidity can be adjacent to the peripheral surface of the heat-shield element and at least one material zone made of a material with a relatively low coefficient of thermal expansion and/or relatively low rigidity can be disposed, from the viewpoint of the peripheral surfaces, in the interior of the material volume. Moreover, in this embodiment, a material zone made of a material with a relatively low coefficient of thermal expansion and/or relatively low rigidity can also be adjacent to the hot side and a material zone made of a material with a relatively high coefficient of thermal expansion and/or of relatively high rigidity can be adjacent to the cold side. Since, particularly in the area of the peripheral surfaces, a cooling of the heat-shield elements of a heat shield takes place due to the sealing-air flow, in heat-shield elements with homogeneous coefficients of thermal expansion in the area of the peripheral surfaces, high stresses occur which arise on account of the particularly low operating temperatures compared with the rest of the heat-shield element. By virtue of the fact that the coefficient of thermal expansion is higher in the area of the peripheral surfaces by comparison with the interior (viewed from the peripheral surfaces) of the heat-shield element, the stresses arising can be reduced. A high rigidity of this area, by contrast, enables the propagation of cracks, once they have occurred, to be effectively prevented. The material in the area of the peripheral surfaces will preferably, however, have both a high coefficient of thermal expansion and a high rigidity.

In a further development of the heat-shield element according to the invention, material zones adjacent to one another made of materials with different coefficients of thermal expansion and/or different rigidities are embodied such that a zone of transition from the one material zone to the other is present. In this zone a progressive or stepless transition from the coefficient of thermal expansion and/or the rigidity of the one material to the coefficient of thermal expansion and/or the rigidity of the other material takes place. Due to the progressive and mutually adapted transition in particular of the coefficient of thermal expansion, the risk of destruction of the heat shield during the production method, in particular during the sintering process, which is carried out at an increased and approximately homogeneous temperature, can be reduced.

The heat-shield element according to the invention can be embodied in particular as a ceramic heat-shield element.

The reduced stress formation as a result of different coefficients of thermal expansion when spatial temperature gradients occur inside the ceramic heat-shield element leads to a reduced tendency for cracks to faint. The presence of a material zone with a more rigid material reduces the risk of long cracks forming in a ceramic heat shield. Particularly if the ceramic heat-shield element has both material zones whose materials have different coefficients of thermal expansion and material zones whose materials have different rigidities, a longer service life of the heat-shield elements can therefore be achieved, which leads to a reduction in the rates of replacement of heat-shield elements in hot-gas linings.

An inventive heat shield which can be embodied in particular as a heat shield for a gas-turbine combustion chamber comprises a number of heat-shield elements adjoining one another at their peripheral surfaces, allowing for an expansion gap, and a sealing-fluid feed for feeding a sealing-fluid flow that seals the expansion gap against the ingress of hot medium. In particular, sealing air can be used as sealing fluid. The heat shield according to the invention is characterized in that the heat-shield elements are embodied as heat-shield elements according to the invention.

A combustion chamber according to the invention is lined with a heat shield according to the invention. It can be embodied in particular as a gas-turbine combustion chamber.

In the method according to the invention for the production of a ceramic heat-shield element, a base material mixture is compression-molded or cast and the compression-molded or cast base material mixture subsequently sintered. The method according to the invention is characterized in that before the sintering of the compression-molded or cast base material mixture, the coefficients of thermal expansion and/or the rigidity of different material zones are adjusted.

Adjusting the coefficients of thermal expansion of different material zones can increase the resistance of a heat-shield element produced by means of the inventive method to temperature gradients inside the heat-shield element, whereas adjusting the rigidity can prevent the lengthening of cracks so that consequently only shorter cracks than in the prior art occur.

The coefficients of thermal expansion and/or the rigidity can be adjusted, for example, by using, when compression-molding or casting, base material mixtures with different compositions for the corresponding material zones. In particular, the composition of the base material mixture can progressively be switched from the one composition to the other such that a progressive transition of the coefficients of thermal expansion or the rigidity can be implemented.

Alternatively, it is also possible to carry out the adjustment of the coefficients of thermal expansion or of the rigidities, whereby, after the compression-molding or the casting of the base material mixture and before the sintering, a reworking of at least one material zone which is intended to have after the sintering a changed coefficient of thermal expansion, for example a relatively low coefficient of thermal expansion compared with the remainder of the base material mixture or a changed rigidity compared with the remainder of the base material mixture. The reworking can for example be effected by impregnating the at least one material zone to be reworked with a fluid. This procedure allows particularly good localization of material zones which are intended to have a changed coefficient of thermal expansion and/or a changed rigidity compared to the remainder of the base material mixture.

If the heat-shield element in the method according to the invention is produced by means of a casting process, then, in particular, a mold according to the invention, as described hereinbelow, can be used for the casting.

A mold according to the invention for the production of a ceramic heat-shield element has a mold shell which comprises a number of mold surfaces and a pouring-in aperture for pouring in a ceramic material. The mold shell is embodied as a single-piece mold shell during casting and the pouring-in aperture is embodied as an opening in one of the mold surfaces. The expression "single-piece mold shell for casting" is not to be understood in this context as indicating that the mold shell is formed monolithically from a single piece but rather as indicating that, during the pouring in of the casting compound, the mold shell does not consist of two elements that are not tightly connected to one another, for example of mold parts merely inserted into a molding box and a die as described with reference to FIGS. 8, 9a and 9b. The mold according to the invention can, however, be composed of a number of individual parts, provided these are tightly connected to one another during the pouring in of the molding compound. In contrast to the mold described in the introduction, no molding box is necessary in the mold according to the invention. Such a molding box impedes in particular the production of graded and/or reinforced heat-shield elements since, during the production of the heat-shield element, the mold parts are disposed inaccessibly in the interior of the molding box.

If the mold is composed of a plurality of individual parts which for the pouring-in process have to be tightly connected to one another to form the single-piece mold shell, it is possible, by detaching the individual parts from one another, to remove the cured heat-shield element with ease.

In contrast to the mold according to the prior art in which one side of the mold is completely absent during the pouring in, in the mold according to the invention a mold surface with a pouring-in aperture for feeding the mold is present. In other words, the mold surface in which the pouring-in aperture is located defines the corresponding surface of the heat-shield element at least in a rudimentary manner. With the mold according to the invention, all the surfaces of the heat-shield element can therefore be shaped at least in a rudimentary manner without the need for compression-molding of the heat-shield element. The mold surface present in rudimentary form in the area of the pouring-in aperture results here in surplus casting material present in the area of the entry aperture can be removed after the curing with the aid of the rudimentary heat-shield element surface formed by the mold surface as a reference surface. The removal of surplus material and the finishing of the heat-shield element are therefore possible with relatively little effort.

Moreover, the dimensions of the cast heat-shield element depend when the mold according to the invention is used not on the quantity of material poured in, since no compression molding is carried out. Since in the compression-molding process according to the prior art, the mold is fully closed, there is no possibility of the casting material escaping from the mold. Varying quantities of casting material therefore lead to the production of heat-shield elements of differing thickness. In the mold according to the invention, by contrast, surplus casting material can escape through the pouring-in aperture without thereby interfering with the dimensions of the heat-shield element. Furthermore, no springing back of the mold under compressive pressure occurs during casting. The mold according to the invention therefore enables the production of heat-shield elements with reduced tolerances.

The mold according to the invention comprises in particular mold surfaces for molding a large-area first surface and a large-area second surface as well as mold surfaces for molding small-area, in comparison to said first and second surfaces, peripheral surfaces which extend from the first surface to the second surface. The pouring-in aperture is then embodied in a mold surface for molding one of the peripheral surfaces.

In a particular embodiment of the mold according to the invention at least one separating element is present by means of which different areas in the interior of the mold shell can be separated from one another. The separating element is embodied and to be disposed in the mold shell such that it can be removed from the interior of the mold shell again before the poured-in ceramic material has cured, without opening the mold. This embodiment enables in particular the production of graded heat-shield elements, that is of such heat-shield elements as comprise at least two areas which consist of materials with different material properties.

The production of a graded heat-shield element can than be effected, for example, whereby the inserts are inserted into the casting mold before the ceramic material is poured in, the ceramic material is then poured in and the inserts are removed again after the ceramic material has been poured in. After the removal of the inserts, the different ceramic materials can come into contact and thus form a materially bonded connection during curing. It is also possible that the adjacent materials will merge in the boundary area when the separating elements are removed so that after curing a heat-shield element is present in which the two materials exhibit a progressive transition into one another.

The at least one separating element can be embodied in particular as an insert for inserting into the mold shell through the pouring-in aperture. In particular, an insert can be present which separates the interior of the mold shell into an area facing toward the mold surface for molding the large-area first surface and an area facing toward the mold surface for molding the large-area second surface. This enables, for example, the production of ceramic heat-shield elements in which the cold side exhibits different material properties from the hot side, for example a different rigidity or a different coefficient of thermal expansion.

A further possibility is to provide two inserts which divide the interior of the mold shell into a central area and into two areas which face toward opposite mold surfaces for the molding of peripheral surfaces of the heat-shield element. With this embodiment, heat-shield elements can be produced which, in the area of the two peripheral sides, exhibit different material properties than in the area lying therebetween, for example different coefficients of thermal expansion or a different rigidity.

In a further embodiment of the mold according to the invention, said mold can comprise at least one retaining element that is to be introduced into the interior of the mold shell. The retaining element is embodied and disposed in the mold shell such that it can fix a body, for example a reinforcing element, in position in the interior of the mold shell and that it can be removed from the interior of the mold shell again before the poured-in ceramic material cures. For example, retaining pins which can be moved from the exterior of the mold shell into the interior of the mold shell and out again can be present as retaining elements. The retaining pins can be disposed in particular in the mold surface for molding a large-area first surface and/or in the mold surface for molding a large-area second surface.

By means of the retaining elements, bodies such as, for example, reinforcing elements can be held in position in the interior of the mold while the ceramic material is poured in. After the ceramic material has been poured in, the retaining elements can be removed from the interior of the mold such that the body is held in position solely by the surrounding ceramic material. After the curing, the body forms a body cast into the ceramic heat-shield element. In this way, high-strength reinforcing elements, for example, can be introduced into a ceramic heat-shield element.

BRIEF DESCRIPTION OF THE DRAWINGS

Further features, properties and advantages of the present invention will emerge from the description below of exemplary embodiments with reference to the accompanying drawings.

FIG. 5b shows a second step of the production method from FIG. 5a.

FIG. 6b shows a second step of the method shown in FIG. 6a.

FIG. 7 shows a ceramic heat-shield element in a perspective representation.

FIG. 8 shows schematically a compression mold for the production of a heat-shield element, as shown in FIG. 7, in a perspective representation.

FIG. 9a shows the compression mold, shown in FIG. 8, in a sectional side view.

FIG. 9b shows the compression mold, shown in FIG. 8, in a plan view.

DETAILED DESCRIPTION OF INVENTION

Figure 1:
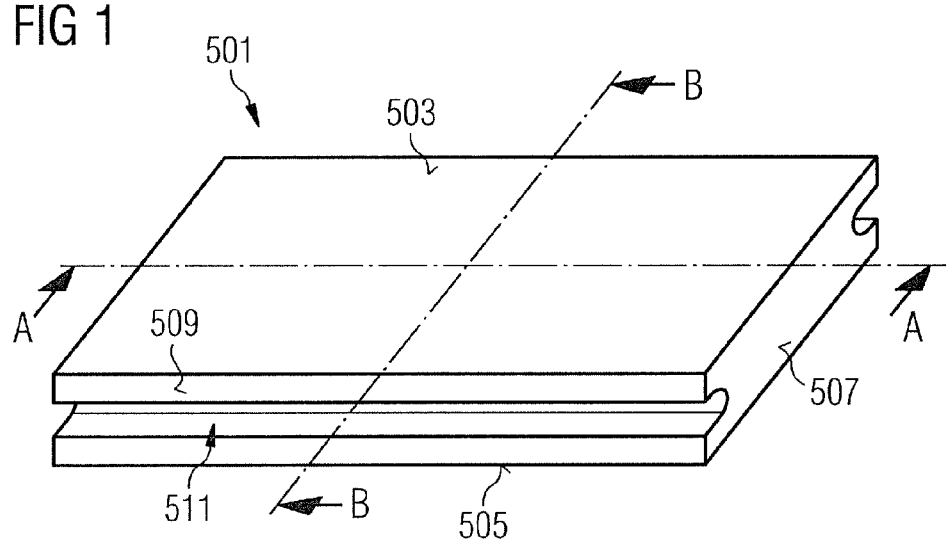
FIG. 1 shows a heat-shield element in a perspective view.

FIG. 1 shows a ceramic heat-shield element 501 according to the invention in a perspective view. The heat-shield element 501 has a hot side 503 which, after installation of the heat-shield element 501 into a heat shield, faces toward the hot medium. Opposite the hot side 503 lies the cold side 505 of the heat-shield element 501 which, after installation into a heat shield, faces toward the supporting structure of the combustion-chamber wall and thus faces away from the hot medium. Hot side 503 and cold side 505 are connected to one another via first peripheral surfaces 507 and second peripheral surfaces 509. The second peripheral surfaces 509 have grooves 511 in which retaining brackets (not shown) connected to the supporting structure of the combustion-chamber wall can engage, in order to hold the heat-shield element in position after installation in a ceramic hot-gas lining. The first peripheral surfaces 507, on the other hand, have no groove.

The hot side 503, the cold side 505, the first peripheral surfaces 507 and the second peripheral surfaces 509 enclose the material volume of the heat-shield element which provides the thermal shielding effect.

Figure 2A:
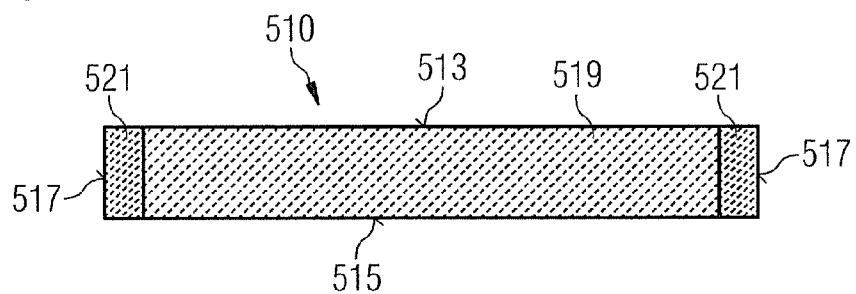
FIG. 2a shows a first embodiment of the heat-shield element shown in FIG. 1 in a section along the line A-A.

A first embodiment of the heat-shield element according to the invention is shown in section in FIG. 2a. The section runs along the line A-A from FIG. 1. The hot side 513, the cold side 515 and the peripheral surfaces 517 without a groove of the heat-shield element 510 of the first embodiment can be seen. The heat-shield element 510 has a first material zone 519 and second material zones 521 which differ from the material zone 519 in their coefficients of thermal expansion. The coefficient of thermal expansion of the material zones 521 is greater than the coefficient of thermal expansion of the material zone 519. In this sense, the material zone 519 has a relatively low coefficient of thermal expansion, whereas the material zones 521 have a relatively high coefficient of thermal expansion.

When constructing a heat shield, for example for a gas-turbine combustion chamber, the supporting structure of the combustion-chamber wall is lined with a number of heat-shield elements 510 in a surface-area-covering manner. The heat-shield elements 510 are fitted adjacent to one another in such a manner that expansion gaps remain between adjacent heat-shield elements 510. These expansion gaps serve to allow an expansion of the heat-shield elements 510 due to the high operating temperatures when the combustion chamber is operating, without the heat-shield elements 510 corning into contact with one another.

In order to prevent a penetration of the hot medium, for example hot combustion gases, through the expansion gaps to the supporting structure of the combustion-chamber wall, the expansion gaps are flushed with sealing air which simultaneously serves to cool the retaining brackets holding the heat-shield elements 510. For this reason, when the combustion chamber is operating, lower temperatures prevail on the first peripheral surfaces 517, around which sealing air flows, and on the second peripheral surfaces around which sealing air likewise flows (cannot be seen in FIG. 2a) than in the central zone 513 of the heat-shield element 510. When the combustion chamber is operating, the centrally located material zone 519 of a conventional heat-shield element would therefore undergo a higher the thermally induced expansion than the material zones 521 lying in the region of the peripheral surfaces. In the areas of lower temperature which are linked in a form-locked manner to the areas of higher temperature, the formation of tensile stresses therefore results. Correspondingly, in the areas of higher temperature compressive stresses result. In other words, the relatively cool material zones 521 would in a conventional heat-shield element as a result of their comparatively low thermal expansion be put under strain by the hot central area 519 which undergoes a greater thermal expansion and could, if the rigidity of the material were exceeded, undergo cracking. The cracks would emanate from the edges of the heat shield and extend toward the interior of the heat shield. Cracking of this kind can reduce the service life of a heat-shield element.

In the heat-shield element 510 according to the invention, the stresses described with reference to a conventional heat-shield element are reduced, particularly in the cool peripheral areas, since the material zones 521 have a higher coefficient of thermal expansion than the central material zone 519. The higher temperature of the central material zone 519 is thus compensated for by the greater coefficient of thermal expansion of the material zones 521 in the region of the peripheral surfaces 517.

The coefficients of thermal expansion of the material zones 519 or 521 and the expansion of these material zones in the material volume of the heat-shield element 510 can be numerically optimized such that the stresses in the heat-shield element 510 are minimized. For example, the expansion of the material zones 521 with relatively high coefficients of thermal expansion can be set by first carrying out a calculation of the temperature field which is set up in the desired operating state, given appropriate constraints in the heat-shield element 510. The size of the areas 521 for the chosen coefficient of thermal expansion can then be adjusted using this result such that the stresses in the heat-shield element 510 are minimized by this means. Of course, the coefficients of thermal expansion and the expansion of material zones can also be optimized simultaneously. It is, however, also possible to specify the expansion, for example, of the peripheral material zones 521 and to find suitable coefficients of thermal expansion by means of optimization.

Figure 2B:
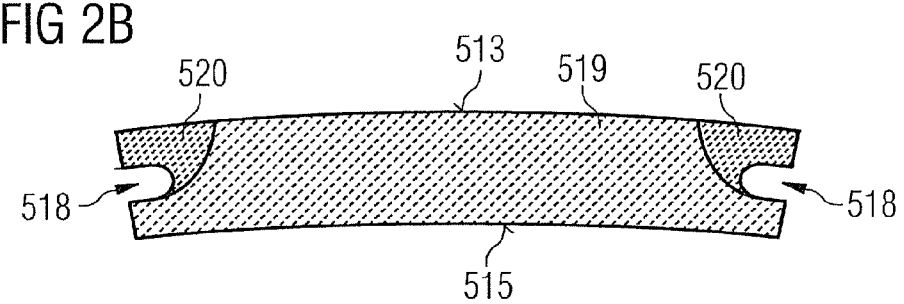
FIG. 2b shows a modification of the heat-shield element shown in FIG. 2a in a section along the line B-B from FIG. 1.

In FIG. 2a, material zones 521 are present in the region of the ungrooved peripheral surfaces 517 of the heat-shield element with higher coefficients of thermal expansion and lower thermal conductivity relative to the central material zone 519. Additionally or alternatively, the heat-shield element 510 according to the invention may also have material zones 520 with a higher coefficient of thermal expansion and lower thermal conductivity relative to the central material zone 519 in the region of the second peripheral surfaces, that is, in the region of the peripheral surfaces with grooves 518 (FIG. 2b).

Figure 3:
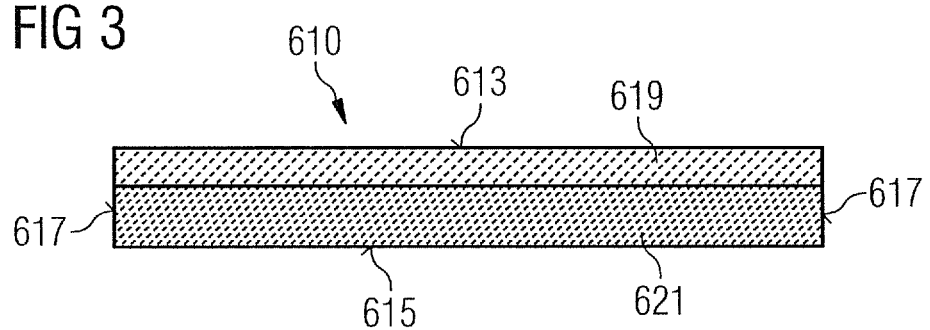
FIG. 3 shows a second embodiment of the heat-shield element shown in FIG. 1 in a section along the line A-A.

A second embodiment of the heat-shield element according to the invention is shown in section in FIG. 3. The section runs along the line A-A shown in FIG. 1. Correspondingly, the hot side 613, the cold side 615 and the ungrooved peripheral surfaces 617 of the heat-shield element 610 can be seen.

The heat-shield element 610 has on the hot side a material zone 619 with a relatively low coefficient of thermal expansion and/or relatively low thermal conductivity. On the cold side, it has a material zone 621 with, relative to the material zone 619 on the hot side, an increased coefficient of thermal expansion, increased thermal conductivity and/or increased mechanical loading capacity. Furthermore, the material of the material zone on the cold side is chosen such that it possesses a greater rigidity than the material of the material zone on the hot side. Less emphasis needs to be placed on the thermal resistivity of the material zone on the cold side than on the thermal resistivity of the material zone on the hot side which has properties particularly suited to the hot-gas conditions. The increased rigidity of the material zone on the cold side increases the rigidity of the heat-shield element as a whole. The thickness of a material zone may be from a few millimeters up to approx. 40 mm. Where a material zone is thin, the respective other material zone is correspondingly thicker and vice versa.

The design of the last-mentioned embodiment takes account of the circumstances that, during operation of a combustion chamber, the hot side 613 of a heat-shield element is exposed to a higher temperature than the usually cooled cold side 615. In the heat-shield element 610, a temperature gradient therefore forms from the hot side 613 to the cold side 615. The lower temperature of the material zone 621 on the cold side is then compensated for during operation of the combustion chamber by its higher coefficient of thermal expansion compared to the material zone 619 on the hot side. Stresses due to the temperature gradient can therefore reliably be avoided. Also, the increased rigidity of the heat-shield element means that cracks, once they have occurred, are unable to propagate toward the center of the heat-shield element so easily.

As material components, both the material zone on the hot side and the material zone on the cold side contain as their main components silicon dioxide ($SiO_2$) and corundum (aluminum oxide $Al_2O_3$). Besides these, zirconia (zirconium dioxide, $ZrO_2$), silicon carbide (SiC) and silicon nitride ($Si_3N_4$) are present. Lanthanides are also present as a doping agent.

The material zone on the cold side additionally has metal phases, for example iron (Fe). The material properties of the different material zones are influenced by the differences in the percentage compositions of the components and by appropriate choice of doping agents and additional components (containing and not containing Fe).

In a variant thereof, the material zone on the hot side can be produced from a material mixture which has a proportion by weight of more than circa 50% aluminum oxide and a proportion by weight of less than 50% aluminum silicate, so that the material zone on the hot side of the burnt heat-shield element of a refractory lining has a proportion by weight of more than circa 50% and less than circa 90% aluminum oxide and/or a proportion by weight of more than circa 10% and less than circa 90% aluminum silicate. In addition, added to the material mixture on the hot side can be a proportion by weight of less than circa 10% colloidal silicic acid solution, which silicic acid solution preferably contains a proportion by weight of more than circa 30% solid matter. Also, a liquid, in particular water, with a proportion by weight of more than circa 1% and less than circa 10% can be added to the material mixture, as can reactive alumina with a proportion by weight of less than circa 30%, in particular of less than circa 25%, in order to achieve the desired properties of the material zone on the hot side of the two-layer heat-shield element.

The material zone on the cold side can be produced from a material mixture which has a proportion by weight of more than circa 50% silicon carbide and a proportion by weight of less than circa 50% aluminum silicate. Silicic acid solution, water and reactive alumina can also be added to the material mixture on the cold side in the same ratio as the material mixture on which the material zone on the hot side is based. The material mixture for the material zone on the cold side has particularly advantageously a proportion by weight of more than circa 5% and less than circa 20% aluminum dioxide and a proportion by weight of more than circa 5% and less than circa 30% microsilica in order to bring about the different properties of the material zones on the hot side and cold side.

Figure 4:
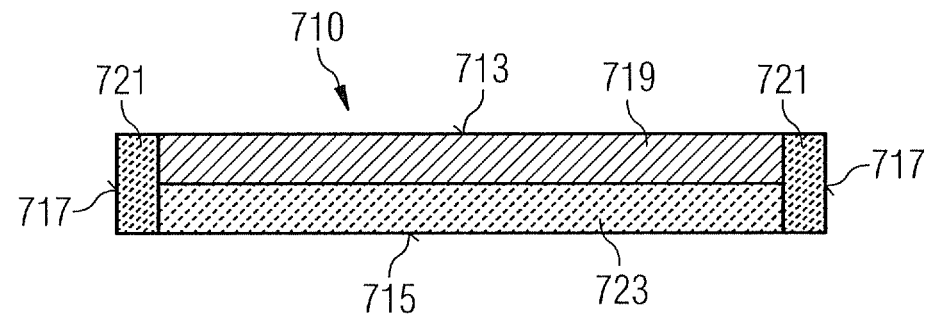
FIG. 4 shows a third embodiment of the heat-shield element shown in FIG. 1 in a section along the line A-A.

A third embodiment of the heat-shield element according to the invention is shown in section in FIG. 4. The section runs along the line A-A shown in FIG. 1. Correspondingly, the cold side 713, the hot side 715 and the ungrooved peripheral surfaces 717 of the heat-shield element 710 can be seen. The heat-shield element 710 has a first material zone 719 on the hot side with a first coefficient of thermal expansion, second material zones 721 on the peripheral sides with a second coefficient of thermal expansion and a material zone 723 on the cold side with a third coefficient of thermal expansion. The second and the third coefficients of thermal expansion can also be identical. Through appropriate choice of the coefficients of thermal expansion of the individual material zones, stresses which arise due to temperature gradients in the interior of the heat-shield element 710 can reliably be minimized. The material zones can also have different rigidities.

Further combinations of material zones with thermal and/or mechanical properties that differ from one another are possible, for example a combination of all the material zones mentioned in the exemplary embodiments described previously.

In all three embodiments of the heat-shield element according to the invention shown here, relatively abrupt transitions between the different material zones and thus relatively abrupt transitions between different coefficients of thermal expansion are shown. The zones with different expansion coefficients should, however, where possible be present not in the form of sharp boundaries of material properties but rather in the form of progressive transitions of material properties so as to avoid the risk of destruction of the heat shield during the production process, in particular during the sintering which takes place at an increased and largely homogeneous temperature.

It can be computationally determined and optimized for the respective application case how the coefficient of thermal expansion and/or of the rigidity must be varied in order that there be no risk of destruction of the heat-shield element during the sintering process, but that at the same time an optimum effect be achieved for avoiding the formation of stresses during operation and for suppressing the propagation of cracks in the material. From this an optimum casting or compression mold for the production of a green compact, that is of a preliminary stage of the heat-shield element from a polymer-ceramic material, can be derived in which there is partial cross-linking of the polymer.

Possible changes in shape of the heat-shield element during the sintering process can in this way be compensated for.

Figure 5A:
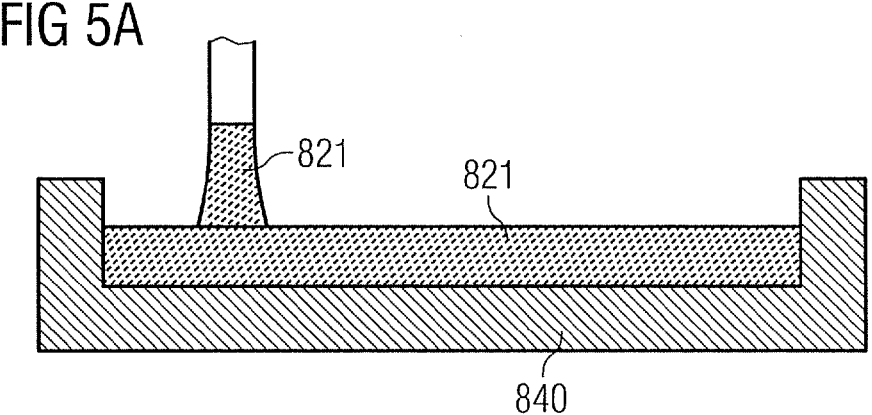
FIG. 5a shows a first step of a first production method in respect of a heat-shield element according to the invention.

An exemplary embodiment of a method for the production of a heat-shield element according to the invention is described below with reference to FIGS. 5a and 5b. FIG. 5a shows a first step of the production method and FIG. 5b a second step. The method comprises the casting of material mixtures into a casting mold 840 in order in this way to mold a green compact and subsequent sintering of the green compact in order to finish the ceramic heat-shield element.

Figure 5B:
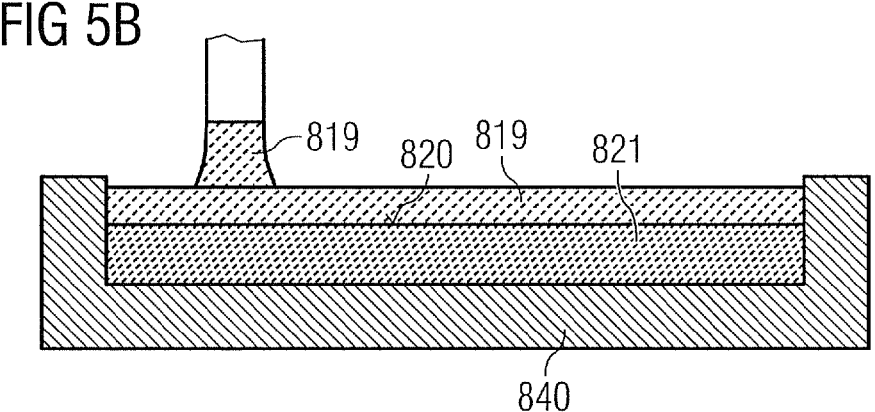

The casting of the material mixtures is shown in FIGS. 5a and 5b. Firstly, a material mixture 821 with a first composition is cast into the casting mold 840 (FIG. 5a). Then a material mixture 819 with a second composition is cast over the first material mixture 821. The material mixtures described with reference to the second embodiment, for example, can be used. The consistency of the material mixtures is such that no complete merging of the two material mixtures occurs. A merging in the area of the boundary surface 820 is, however, desired.

The compositions of the material mixtures 819 and 821 are chosen such that after sintering the material mixture 819 has a lower coefficient of thermal expansion than the material mixture 821.

Although in the production method described a merging of the material mixtures 819, 821 is desired in the area of the boundary surface 820, a heat-shield element according to the invention can, however, also be produced without this kind of merging. After the sintering of the cast heat-shield element, a heat-shield element as shown in FIG. 3 is obtained.

In the variant of the casting of a heat-shield element according to the invention described with reference to FIGS. 5b and 5b, this heat-shield element is cast horizontally, i.e. either the part of the casting mold serving to mold the hot side or the part of the casting mold serving to mold the cold side constitutes the bottom side of the casting mold. In FIGS. 5a and 5b, for example, the part of the casting mold serving to mold the cold side constitutes the bottom side.

Figure 5C:
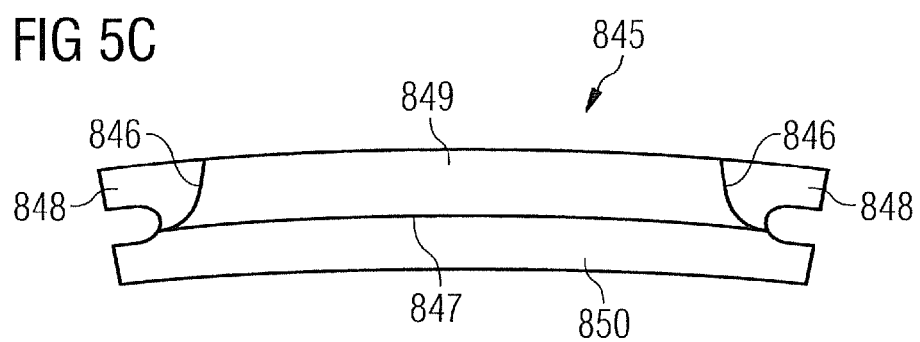
FIG. 5c shows an alternative variant of the method shown in FIGS. 5a and 5b.

In an alternative variant of the casting, the casting of the heat-shield element is carried out with a vertical casting mold, i.e. the part of the casting mold which molds the cold side and the part of the casting mold which molds the hot side are side walls of the casting mold, whereas the bottom side of the casting mold is a part of the mold which molds one of the peripheral surfaces of the heat-shield element. This variant of the casting is shown in FIG. 5c which shows a vertical casting mold in plan view. In the vertical casting mold 845, templates 846, 847 can serve to separate different areas 848, 849, 850 of the casting mold 845 from one another. Different material mixtures are cast into the different areas of 848, 849, 850. With the mold from FIG. 5c, three different material mixtures, for example, can be used, namely one for the area 848, one for the area 849 and one for the area 850. It is, however, also possible for the two sections 848 which are separated from one another likewise to use different material mixtures, so that four material mixtures are used in total. In addition, different material mixtures can also be poured consecutively into one area, as described with reference to FIGS. 5a and 5b.

After the casting, the templates are removed in order to bring about a bonding of the cast material mixtures. Here, too, the consistency of the material mixtures is chosen such that in the area of the boundary surfaces a merging of the material mixtures occurs after the removal of the templates.

Of course, the use of templates for subdividing the casting mold into different material zones is also possible in the case of a horizontal casting mold.

Figure 6A:
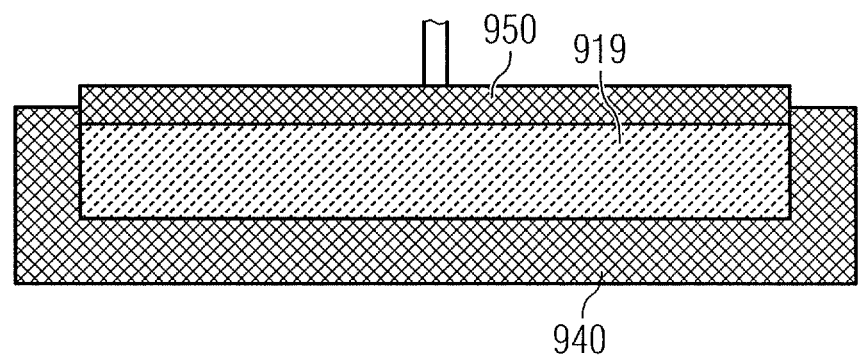
FIG. 6a shows a first step of a second production method in respect of a heat-shield element according to the invention.
Figure 6B:
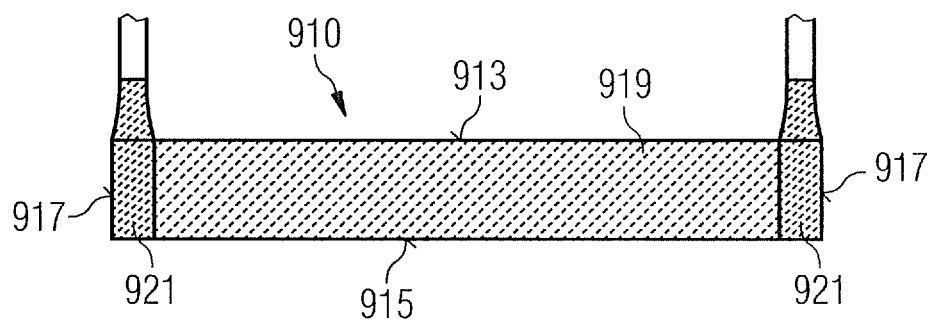

A second production method for heat-shield elements according to the invention will now be described with reference to FIGS. 6a and 6b. In this method, a material mixture 919 is put into a compression mold 940, 950 and then compressed. The result is a green compact 910 of the heat-shield element. This green compact 910 is shown in FIG. 6b. The hot side 913, the cold side 915 and the ungrooved peripheral surfaces 917 of the green compact 910 can be identified. In the area of the ungrooved peripheral surfaces 917, the green compact 910 is impregnated with a liquid which affects the sintering process. The liquid is chosen such that after sintering the impregnated areas 921 have a higher coefficient of thermal expansion and/or a higher rigidity than the non-impregnated area 919.

Optionally, the peripheral areas of the green compact 910 that are furnished with grooves (cannot be seen in FIG. 6*b*) can also be impregnated in order to increase the coefficient of thermal expansion and/or the rigidity of the corresponding areas. The result of the method described with reference to FIGS. 6*a* and 6*b* is a heat-shield element as shown in FIG. 2.

The mold can also be filled horizontally or vertically when the heat-shield element is compression-molded and the material mixtures poured in using templates. The compression mold in this case can—as incidentally can the casting mold when a heat-shield element is cast—be erected and filled at any angle.

While the production of a heat-shield element as shown in FIG. 3, for example, is described with reference to FIGS. 5*a* and 5*b*, it is however also possible to use the same method to produce heat-shield elements as shown in FIG. 2 or 4. The same applies to the method which has been described with reference to FIGS. 6*a* and 6*b*. With this method, too, not only is it possible to produce a heat-shield element as described with reference to FIG. 2, but it is also possible to use this method to produce heat-shield elements as shown in FIG. 3 or 4.

In the preceding exemplary embodiments, material zones with different coefficients of thermal expansion have principally been described. It should therefore be noted that in those exemplary embodiments in which, in respect of the material zones, only different thermal expansion coefficients have been described, said material zones can additionally or alternatively also exhibit different rigidities.

Figure 10:
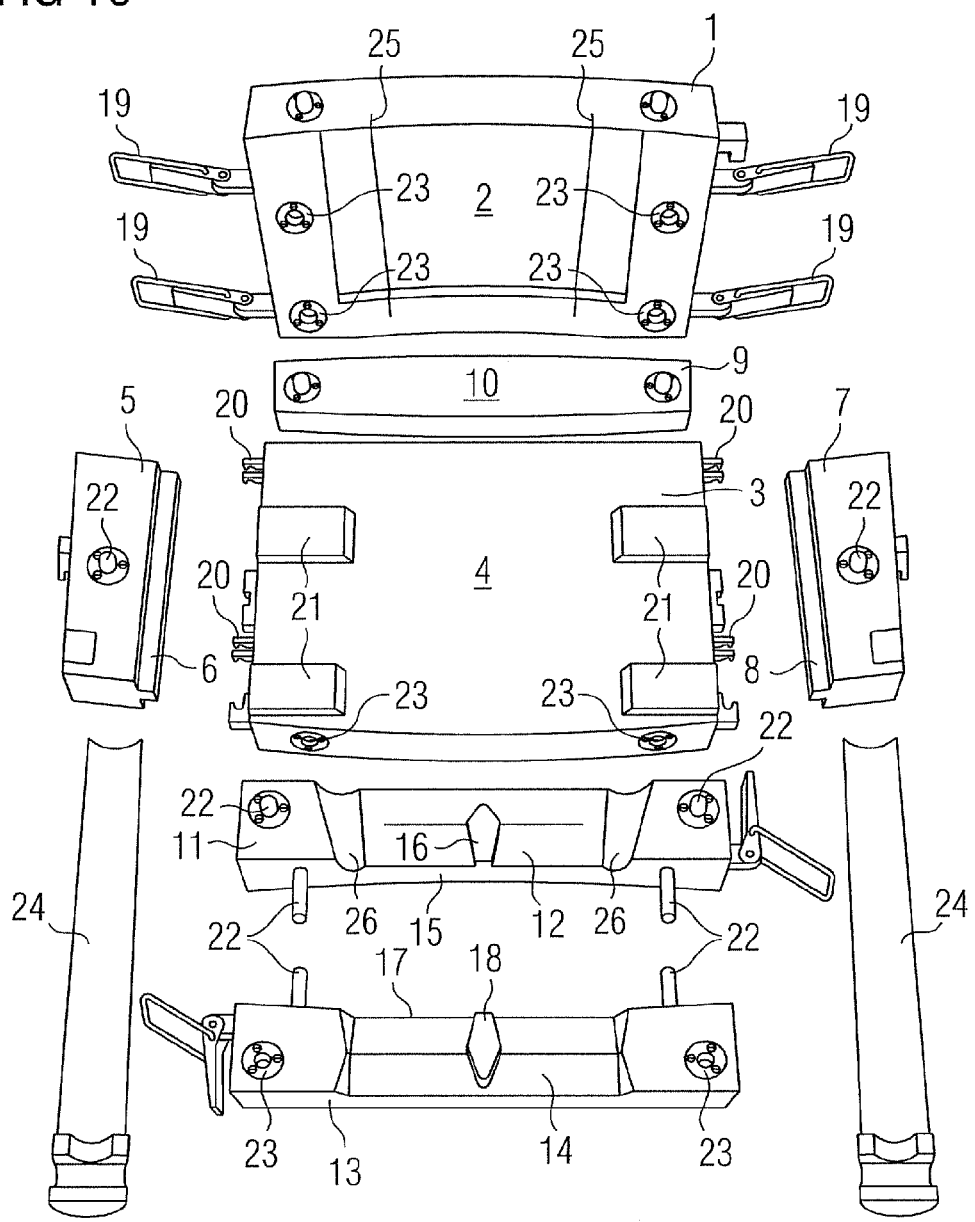
FIG. 10 shows the individual parts of a first exemplary embodiment of the mold according to the invention.

FIG. 10 shows a first exemplary embodiment of a mold according to the invention for the production of a ceramic heat-shield element, as shown schematically in FIG. 1. The figure shows the individual parts of the mold shell which are tightly but detachably connected to one another before a ceramic material is poured in. In the present exemplary embodiment the connection is effected by means of clamp connections, but it can equally well also be achieved by means of other detachable connections, for example, screw connections. Clamp connections have, however, the advantage compared with screw connections that they can be produced and released again without tools.

The individual parts which can be connected to the mold shell comprise the shell elements 1 and 3 which have mold surfaces 2 and 4 by means of which the hot side 102 and the cold side 104 of the heat-shield element 100 are molded.

Side parts 5 and 7, which respectively have a spring-type projection 6,8, are also present. These two individual parts form the mold surfaces for the peripheral sides 108 of the heat-shield element 100 which are provided with the grooves 110. The spring-type projections 6, 8 serve here to shape the grooves.

The mold shell also comprises a bottom element 9 which has a mold surface 10 for molding one of the peripheral sides 106 of the heat-shield element 100 without grooves. When the heat-shield element is cast, the mold stands on the bottom element 9.

Finally, two shell elements 11, 13 are present which are located opposite the bottom element 9 in the assembled mold shell. The two shell elements 11, 13 are provided with recesses 12, 14 which are disposed such that, after the two shell elements 11, 13 have been assembled, they form a pouring-in aperture for pouring in the ceramic material. These two shell parts also each have a mold surface 15, 17 by means of which edge zones of the second peripheral side 106 can be molded without a groove. Also present in the recesses are webs 16, 18 by means of which the pouring-in aperture of the assembled mold shell is subdivided into two partial apertures. If the ceramic material is poured only into the one partial aperture, air can escape from the interior of the mold shell through the other partial aperture.

Figure 15:
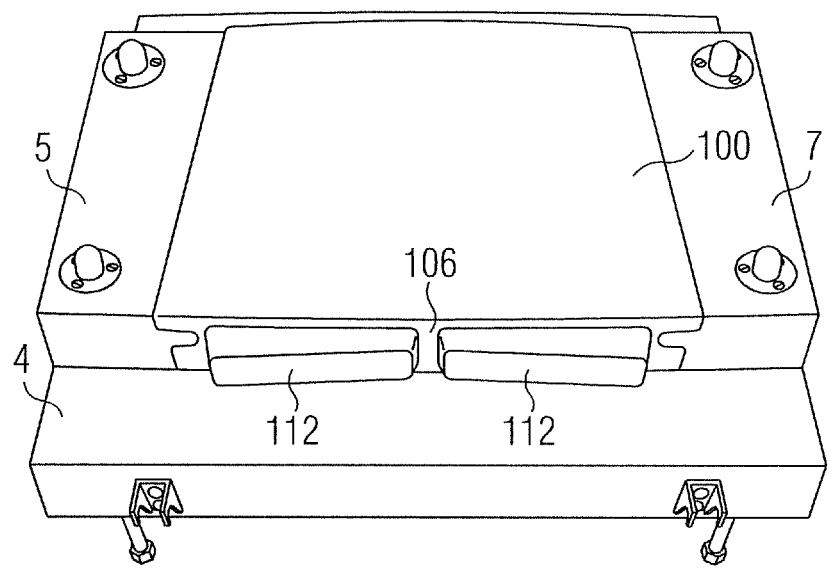
FIG. 15 shows an open mold according to the invention having a ceramic heat-shield element disposed therein.

FIG. 15 shows the mold shell in the partially assembled state after the casting of a ceramic heat-shield element 100. The shell parts 4, 5, and 7 from FIG. 10 can be seen. FIG. 15 shows in particular that during the casting parts of the peripheral side 106 are molded in the area of the pouring-in aperture. Casting residues 112 on the ceramic heat-shield element 100 are removed mechanically after the curing. The parts of the peripheral side 106 which have already been shaped can serve in this case as a reference surface.

In order to connect the shell elements to one another tightly, the shell element 1 is equipped with four clamping elements 19 which can be engaged with hooks 20 of the shell element 3 and tensioned. In order during tensioning to prevent slipping of the side elements 5, 7 disposed between the shell elements 1 and 3, the base element 9 and the shell elements 11, 13 forming the pouring-in aperture, mold projections 21 are present which interact in a form-locking manner with various mold projections or recesses of other shell elements. In addition, pins 22 are present which engage in receptacles 23 of adjacent mold elements and thus prevent shifting of the mold elements relative to one another.

The mold shown in FIG. 10 also comprises inserts 24 which can be introduced through the pouring-in aperture into the interior of the mold shell in order to separate different areas in the interior of the mold shell from one another. To guide the inserts 24 when they are introduced into the assembled mold shell, guide grooves 25 are present in the shell element 1. The shell element 11 also has guide recesses 26 for guiding the inserts 24.

The inserts 24 are introduced into the assembled mold shell before the casting of a heat-shield element such that in its interior areas which are adjacent to the shell elements 5, 7 with the spring-like projections 6, 8 are separated from a central area. A different ceramic material is poured into the areas which are adjacent to the shell elements 5, 7 than into the central area of the mold shell. After the pouring in, the inserts 24 are removed from the mold shell so that the two materials can mix with one another in the boundary region and during curing produce a materially bonded connection. In this way, graded heat-shield elements can be produced.

Figure 16:
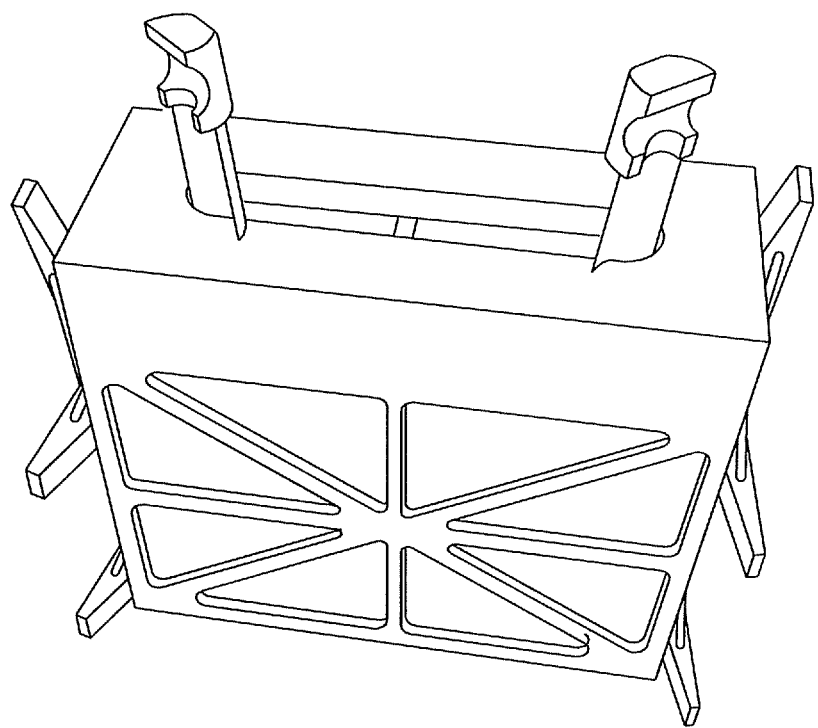
FIG. 16 shows a mold shell having inserts disposed therein for separating different areas in the interior of the mold shell.

The assembled mold shell with inserts disposed therein is shown in FIG. 16.

Figure 11:
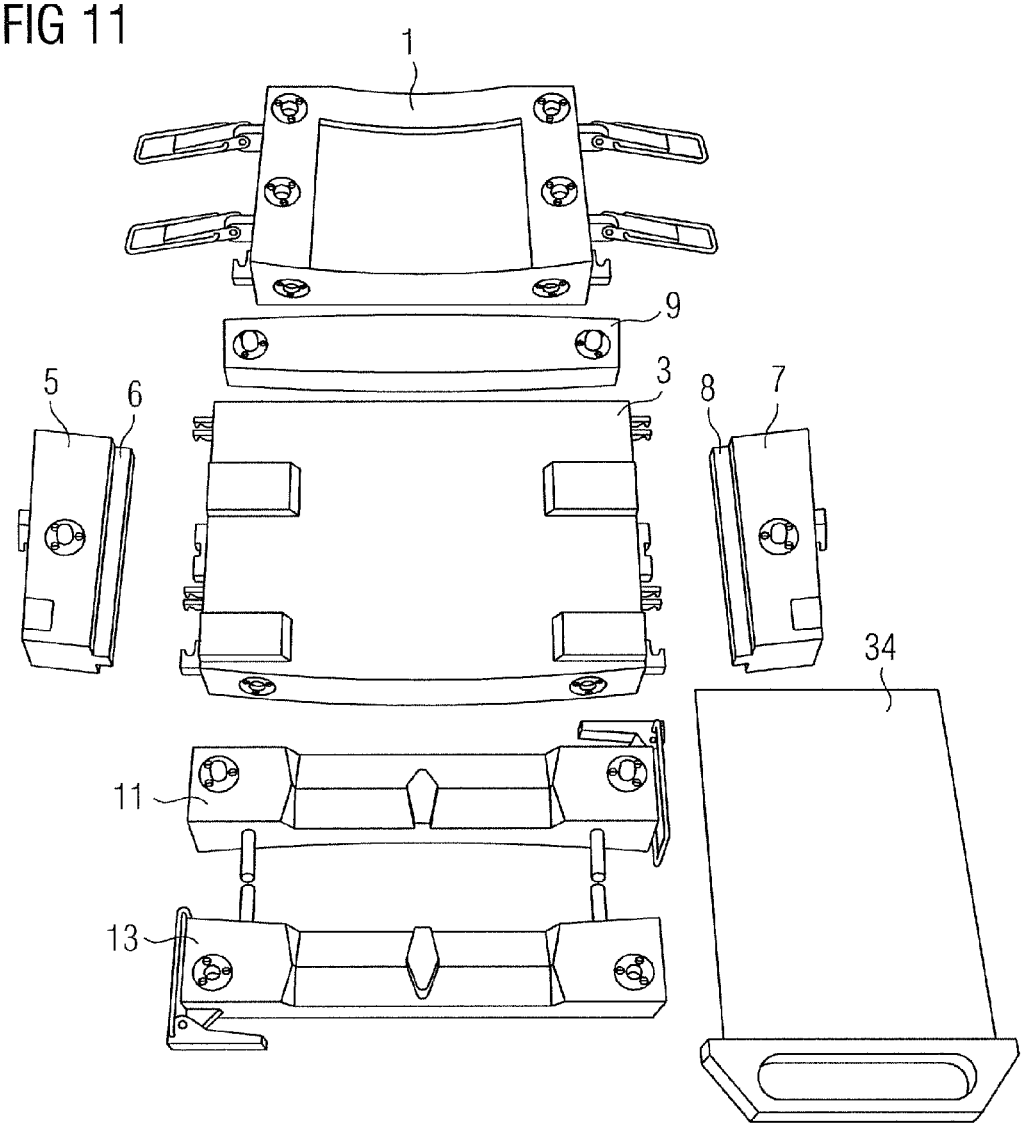
FIG. 11 shows the individual parts of a second exemplary embodiment of the mold according to the invention.

A second exemplary embodiment of the mold according to the invention is shown in FIG. 11. Like FIG. 10, FIG. 11 shows the mold shell of the mold in individual parts. In order to avoid repetitions, only the differences in relation to the mold shown in FIG. 10 will be dealt with. The reference numerals of the shell elements shown in FIG. 11 match the reference numerals of the corresponding shell elements from FIG. 10.

In contrast to the mold shown in FIG. 10, the mold shown in FIG. 11 comprises only one insert 34 which is suitable separates the interior of the assembled mold shell into a hot-side area, i.e. an area which adjoins the shell element 1 with the mold surface 2 for molding the hot side 102, and a cold-side area, i.e. an area which adjoins the shell element 3 with the mold surface 4 for molding the cold side 104. Accordingly, no guide grooves are present in the shell elements 1 and 11. Instead, the spring-like projections 6 and 8 have guide grooves for guiding the insert 34.

Figure 17:
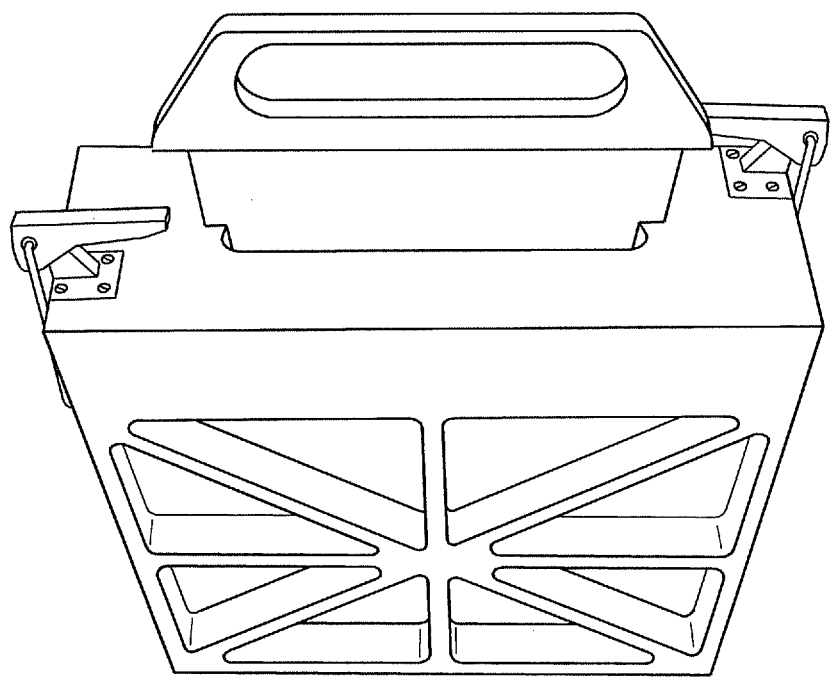
FIG. 17 shows a mold shell having an insert disposed therein for separating different areas in the interior of the mold shell.

The assembled mold shell from FIG. 11 with insert disposed therein is shown in FIG. 17.

Figure 12:
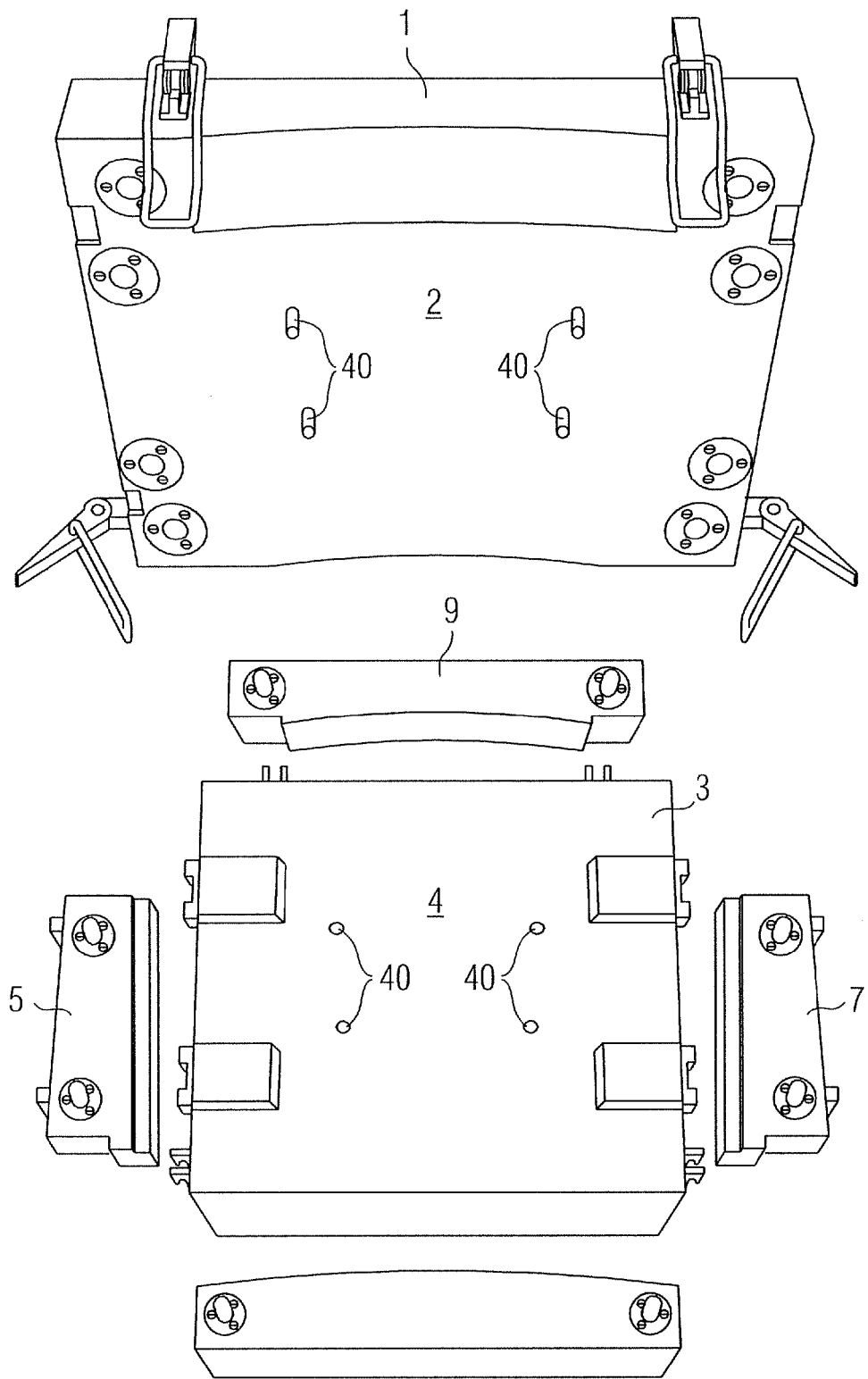
FIG. 12 shows the individual parts of a third exemplary embodiment of the mold according to the invention.

FIG. 12 shows a third exemplary embodiment of the mold according to the invention. Like FIGS. 10 and 11, FIG. 12 shows the mold shell broken down into its individual parts. The individual parts are designated by the same reference numerals as the corresponding individual parts from FIGS. 10 and 11. In order to avoid unnecessary repetitions, only the differences relative to the mold shown in FIGS. 10 and 11 will be referred to at this point.

Figure 13:
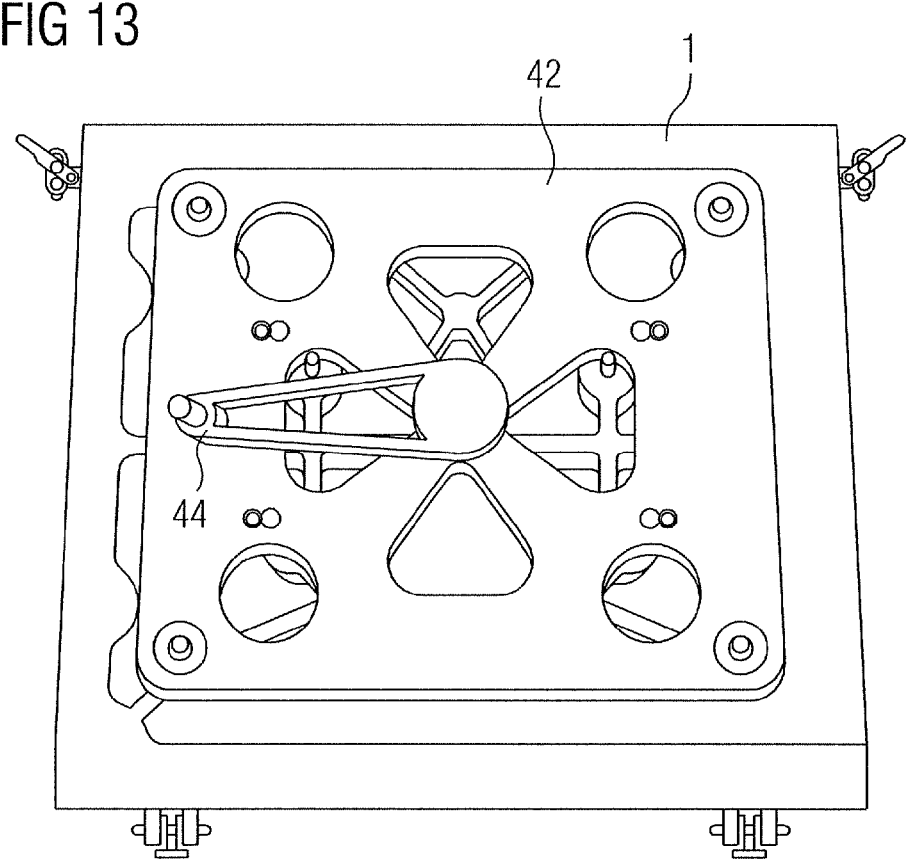
FIG. 13 shows the mold of the third exemplary embodiment in a side view.
Figure 14:
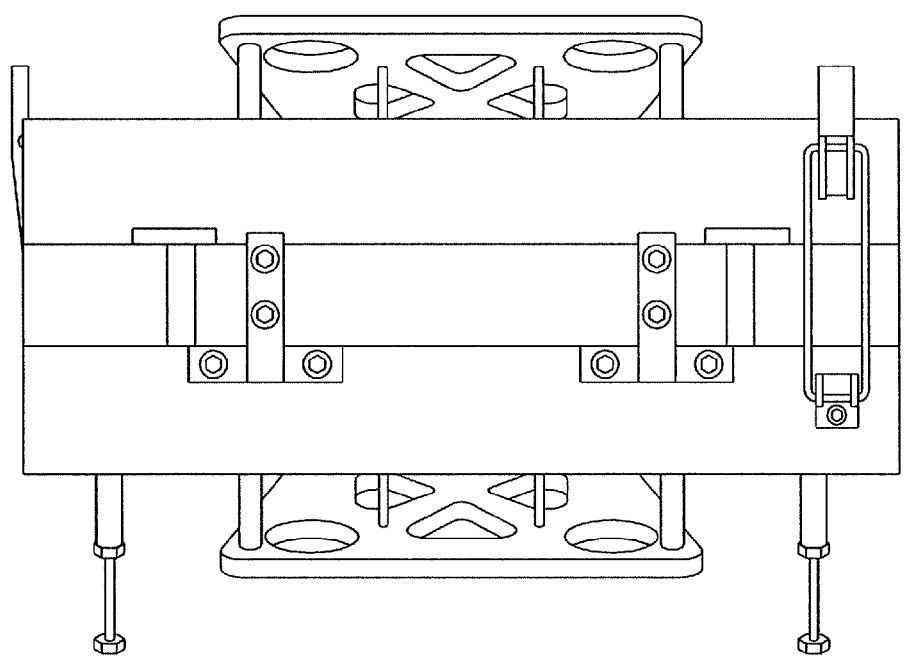
FIG. 14 shows the mold of the third exemplary embodiment in a plan view.

The mold shell from FIG. 12 is not provided for the insertion of inserts. Accordingly, the shell elements also have no guide grooves for such mold parts. Instead, retaining pins 40 are present in the shell elements 1 and 3, which retaining pins are movably arranged such that when the mold shell is assembled they are to be introduced from the exterior of the shell elements 1, 3 into the interior of the mold shell. For this purpose, a retaining-pin plate 42, carrying the retaining pins 40, is arranged on the exterior of the mold shells 1, 3, the distance of which plate from the outside of the respective shell element 1, 3 can be varied by means of a crank 44 or by means of an automated embodiment of the retaining pins 40. If the retaining-pin plate 42 lies fully adjacent to the outside of the shell element 1, the retaining pins 40 project maximally into the interior of the mold shell. This state is shown with reference to the shell element 1 in FIGS. 12 and 13. If, on the other hand, the retaining-pin plate 42 is at its maximum distance from the outside of the shell element 1, then the retaining pins 40 are sunk fully in the wall of the shell element so that they no longer project into the interior of the mold shell. This state is shown in FIG. 14 and in FIG. 6 in the case of shell element 3.

The retaining pins 40 can as retaining elements be used, for example, to hold reinforcing elements in position in the interior of the mold shell during the pouring in of the ceramic material. The holding in position can be accomplished for example simply by means of the retaining pins 40 pressing against the reinforcing element from two opposite sides and fixing this reinforcing element in position by means of the friction which occurs in the process. Alternatively, it is also possible to provide apertures in the reinforcing element into which the retaining pins 40 can engage in order to hold the reinforcing element in position.

In particular planar reinforcing elements can be introduced as reinforcing elements into the interior of the mold shell said reinforcing elements extending, for example, parallel to the hot side or cold side 102, 104 of the heat-shield element 100 that is to be molded. However, rod-shaped or bone-shaped reinforcing elements can also be introduced into the interior of the mold shell, said reinforcing elements essentially extending along the shell elements 5, 7, 9 which mold the peripheral sides 106, 108 of the heat-shield element 100. In the finished heat-shield element, the reinforcing elements then extend along the peripheral sides 106, 108.

After the fixing in position of the reinforcing elements in the interior of the mold shell, a ceramic material is poured into the mold shell. The retaining pins 40 are then withdrawn from the interior of the mold shell by means of the crank 44 or an automatic extraction device. This state is shown in FIG. 14.

The reinforcing elements are then fixed in their position solely by the introduced ceramic material.

The invention claimed is:

1. A method to make a ceramic heat-shield element, comprising:
   compressing or casting a base material mixture;
   adjusting material properties of different material zones of the base material mixture; and
   sintering the pressed or casted base material mixture,
   wherein a first material property is a coefficient of thermal expansion, and
   wherein the adjusting includes:
      creating a first material zone in the heat shield element including a first coefficient of thermal expansion, and
      creating a second material zone in the heat shield element including a second coefficient of thermal expansion which differs from the first coefficient of thermal expansion, and wherein the first and second coefficients of thermal expansion are numerically optimized so that the stresses in the heat shield element are minimized using a calculation of a temperature field in the heat shield element set up in a desired operating state, wherein the ceramic heat-shield element comprises:
   a hot side disposed to face toward a hot medium, and
   a cold side disposed to face away from the hot medium,
   the method further comprising connecting the cold side and the hot side of the ceramic heat-shield element at least by way of a pair of mutually opposed peripheral surfaces, and
   arranging the second coefficient of thermal expansion of the second material zone to be higher relative to the first coefficient of thermal expansion of the first material zone, wherein the second material zone comprises the pair of mutually opposed peripheral surfaces of the ceramic heat-shield element.

2. The method as claimed in claim 1, wherein a second material property is a rigidity.

3. The method as claimed in claim 1, wherein the adjustment of the material properties of different material zones is effected based upon material mixtures of different compositions for the corresponding material zones.

4. The method as claimed in claim 3, wherein during compression or casting of adjacent material zones the composition of the base material mixture is changed over progressively from a first composition to a second composition.

5. The method as claimed in claim 1, wherein the adjustment of the material properties is made after the compression molding or casting of the base material mixture and before the sintering based upon an aftertreatment of at least one material zone to effect altered material properties between the treated material zone and the remaining base material mixture.

6. The method as claimed in claim 1, wherein one material zone is impregnated with a fluid to change the material property of the material zone before sintering.

7. The method as claimed in claim 1, wherein the size of the first material zone and the second material zone are adjusted based on the result of the calculation such that the stresses in the heat shield element are minimized.

* * * * *